United States Patent
Melanson et al.

(10) Patent No.: US 9,325,434 B2
(45) Date of Patent: Apr. 26, 2016

(54) SYSTEMS AND METHODS FOR REDUCING DIGITAL INTERFERENCE OF EXTERNAL SIGNALS

(71) Applicant: Cirrus Logic, Inc., Austin, TX (US)

(72) Inventors: John L. Melanson, Austin, TX (US); John C. Tucker, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 51 days.

(21) Appl. No.: 14/276,237

(22) Filed: May 13, 2014

(65) Prior Publication Data
US 2015/0331656 A1  Nov. 19, 2015

(51) Int. Cl.
| | |
|---|---|
| G06F 17/00 | (2006.01) |
| H04B 15/04 | (2006.01) |
| G06F 3/16 | (2006.01) |
| G05B 15/02 | (2006.01) |
| G06F 1/08 | (2006.01) |
| G05F 1/14 | (2006.01) |

(52) U.S. Cl.
CPC ............ *H04B 15/04* (2013.01); *G05B 15/02* (2013.01); *G05F 1/14* (2013.01); *G06F 1/08* (2013.01); *G06F 3/165* (2013.01); *H04B 2215/067* (2013.01); *H04B 2215/068* (2013.01)

(58) Field of Classification Search
CPC ....... G06F 1/08; G06F 1/14; H04B 2215/064; H04B 2215/065; H04B 15/04
See application file for complete search history.

(56) References Cited

U.S. PATENT DOCUMENTS

| 7,558,348 B1 | 7/2009 | Liu et al. |
|---|---|---|
| 2011/0115537 A1 | 5/2011 | May et al. |

FOREIGN PATENT DOCUMENTS

EP  0608615 A2  8/1994

OTHER PUBLICATIONS

International Search Report and Written Opinion, International Patent Application No. PCT/US2015/028997, Jul. 16, 2015, 10 pages.

*Primary Examiner* — Andrew C Flanders
(74) *Attorney, Agent, or Firm* — Jackson Walker L.L.P.

(57) ABSTRACT

A mobile device may include a digital data driver and digital data receiver for communication of digital signals within the mobile device at a selected clock rate. The mobile device may also have a device external for the digital data driver and digital data receiver for communication of external signals, such as radio-frequency signals, to and from the mobile device. To avoid interference of frequency harmonics of a digital signal with such external signals, the digital data driver may be configured to control the digital signal based on the frequency of the external signals, such that interference of the external signal by spectral content of the digital signal is minimized, while maintaining the selected clock rate.

25 Claims, 2 Drawing Sheets

SYSTEMS AND METHODS FOR REDUCING DIGITAL INTERFERENCE OF EXTERNAL SIGNALS

FIELD OF DISCLOSURE

The present disclosure relates in general to audio systems, and more particularly, to reducing interference by digital signals of other signals external to the digital signal, for example, radio-frequency signals.

BACKGROUND

Personal mobile devices, such as mobile/cellular telephones, cordless telephones, and other consumer audio devices, are in widespread use. Such personal mobile devices often include complex circuitry, including radio-frequency transceivers for transmitting and receiving analog radio-frequency signals (mobile telephony signals, Global Positioning System signals, Wireless Fidelity signals, etc.), and digital circuitry for processing and communicating digital signals.

In many personal mobile devices, digital signals may be driven by a digital data driver over relatively long distances on a digital bus. In some instances, frequency harmonics caused by characteristics of a digital signal (e.g., edge rate, switching frequency, etc.) may cause signal interference with the radio-frequency signals, potentially leading to undesirable operation of the personal mobile device.

SUMMARY

In accordance with the teachings of the present disclosure, certain disadvantages and problems associated with non-linear distortion of a microphone signal may be reduced or eliminated.

In accordance with embodiments of the present disclosure, a system may include a digital data driver for generating a digital signal for communication to a digital data receiver at a selected clock rate. The digital data driver may be configured to receive an indication of a frequency of an external signal associated with a device external to the digital data driver and the digital data receiver, and when generating the digital signal, control the digital signal based on the frequency such that interference of the external signal by spectral content of the digital signal is minimized, while maintaining the selected clock rate.

In accordance with these and other embodiments of the present disclosure, a method may include receiving an indication of a frequency of an external signal associated with a device external to a digital data driver and a digital data receiver, wherein the digital data driver is configured to generate a digital signal for communication to the digital data receiver at a selected clock rate. The method may also include controlling the digital signal based on the frequency such that interference of the external signal by spectral content of the digital signal is minimized, while maintaining the selected clock rate.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
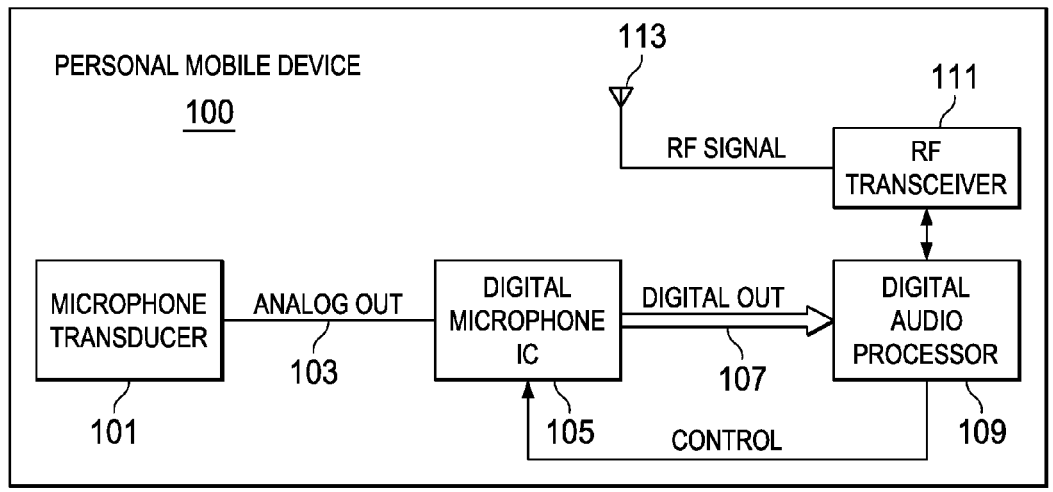
FIG. 1 illustrates a block diagram of selected components of an example personal mobile device, in accordance with embodiments of the present disclosure.

FIG. 1 illustrates a block diagram of selected components of a personal mobile device 100, in accordance with embodiments of the present disclosure. Personal mobile device 100 may comprise any electronic device sized and shaped such that mobile device 100 is readily transported on a person of a user of mobile device 100 and may include but is not limited to a smart phone, a tablet computing device, a handheld computing device, a personal digital assistant, or a notebook computer. As shown in FIG. 1, personal mobile device 100 may comprise an audio system including a microphone transducer 101, a digital microphone integrated circuit (IC) 105, and a digital audio processor 109. Personal mobile device 100 may also include a radio-frequency (RF) transceiver 111.

Microphone transducer 101 may comprise any system, device, or apparatus configured to convert sound incident at microphone transducer 101 to an electrical signal, for example analog output signal 103, wherein such sound is converted to an electrical signal using a diaphragm or membrane having an electrical capacitance that varies as based on sonic vibrations received at the diaphragm or membrane. Microphone transducer 101 may include an electrostatic microphone, a condenser microphone, an electret microphone, a microelectromechanical systems (MEMs) microphone, or any other suitable capacitive microphone.

Digital microphone IC 105 may comprise any suitable system, device, or apparatus configured to process analog output signal 103 to generate a digital audio output signal 107 and condition digital audio output signal 107 for transmission over a bus to digital audio processor 109. Once converted to digital audio output signal 107, the audio signal may be transmitted over significantly longer distances without being susceptible to noise as compared to an analog transmission over the same distance. In some embodiments, digital microphone IC 105 may be disposed in close proximity with microphone transducer 101 to ensure that the length of the analog line between microphone transducer 101 and digital microphone IC 105 is relatively short to minimize the amount of noise that can be picked up on an analog output line carrying analog output signal 103. For example, in some embodiments, microphone transducer 101 and digital microphone IC 105 may be formed on the same integrated circuit die or substrate.

Digital audio processor 109 may comprise any suitable system, device, or apparatus configured to receive and process digital audio output signal 107 for use in a digital audio system. Thus, digital audio processor 109 may be considered a digital data receive for digital audio output signal 107. For example, digital audio processor 109 may comprise a microprocessor, microcontroller, digital signal processor (DSP), application specific integrated circuit (ASIC), or any other device configured to interpret and/or execute program instructions and/or process data, such as digital audio output signal 107.

RF transceiver 111 may comprise any suitable system, device, or apparatus configured to transmit, receive (e.g., via antenna 113), and/or process radio-frequency signals, such as, for example, mobile telephony signals (e.g., 2G, 3G, 4G, Long Term Evolution, etc.), Global Positioning System (GPS) signals, and Wireless Fidelity (WiFi) signals.

Figure 2:
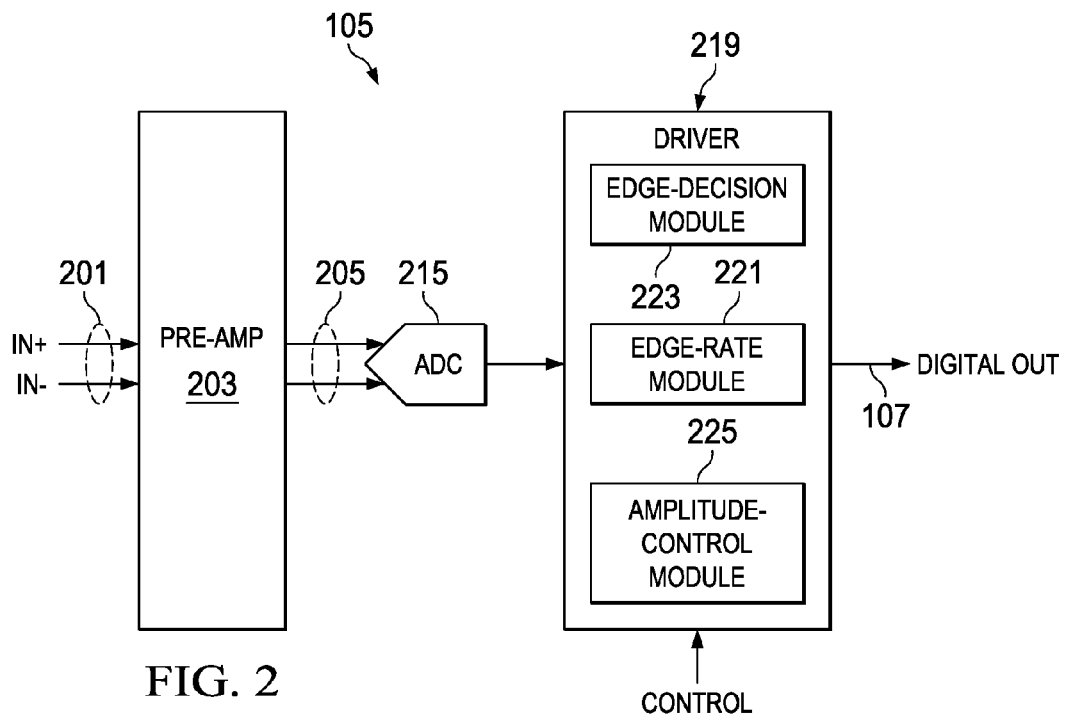
FIG. 2 illustrates a block diagram of selected components of a digital microphone integrated circuit, in accordance with embodiments of the present disclosure.

FIG. 2 illustrates a block diagram of selected components of digital microphone IC 105, in accordance with embodiments of the present disclosure. As shown in FIG. 2, digital microphone IC 105 may include a pre-amplifier 203, an analog-to-digital converter (ADC) 215, and a driver 219. Pre-amplifier 203 may receive analog output signal 103 via one or more input lines 201 which may allow for receipt of a single-ended signal, differential signal, or any other suitable analog audio signal format and may comprise any suitable system, device, or apparatus configured to condition analog output signal 103 for processing by ADC 215. The output of pre-amplifier 203 may be communicated to ADC 215 on one or more output lines 205.

ADC 215 may comprise any suitable system, device, or apparatus configured to convert an analog audio signal received at its input, to a digital signal representative of analog output signal 103. ADC 215 may itself include one or more components (e.g., delta-sigma modulator, decimator, etc.) for carrying out the functionality of ADC 215.

Driver 219 may receive the digital signal output by ADC 215 and may comprise any suitable system, device, or apparatus configured to condition such digital signal (e.g., encoding into Audio Engineering Society/European Broadcasting Union (AES/EBU), Sony/Philips Digital Interface Format (S/PDIF), or other suitable audio interface standards), in the process generating digital audio output signal 107 for transmission over a bus to digital audio processor 109. In FIG. 2, the bus receiving digital audio output signal 107 is shown as single-ended. In some embodiments, driver 219 may generate a differential digital audio output signal 107. As shown in FIG. 2, driver 219 may comprise an edge-rate module 221, an edge-decision module 223, and/or an amplitude-control module 225, each of which are described in greater detail below.

In order to reduce or eliminate signal interference by digital audio output signal 107 with radio-frequency signals associated with RF transceiver 111, driver 219 may be configured to receive an indication of a frequency of an RF signal associated with RF transceiver 111, and, when generating digital audio output signal 107, control digital audio output signal 107 based on the frequency such that interference of the RF signal by spectral content of digital audio output signal 107 is minimized, while maintaining (e.g., while not changing or altering) a selected clock rate for digital audio output signal 107. In some embodiments, driver 219 may control digital audio output signal 107 by controlling one or more transitions between logic levels of digital audio output signal 107 based on the frequency of the RF signal.

Figure 3:
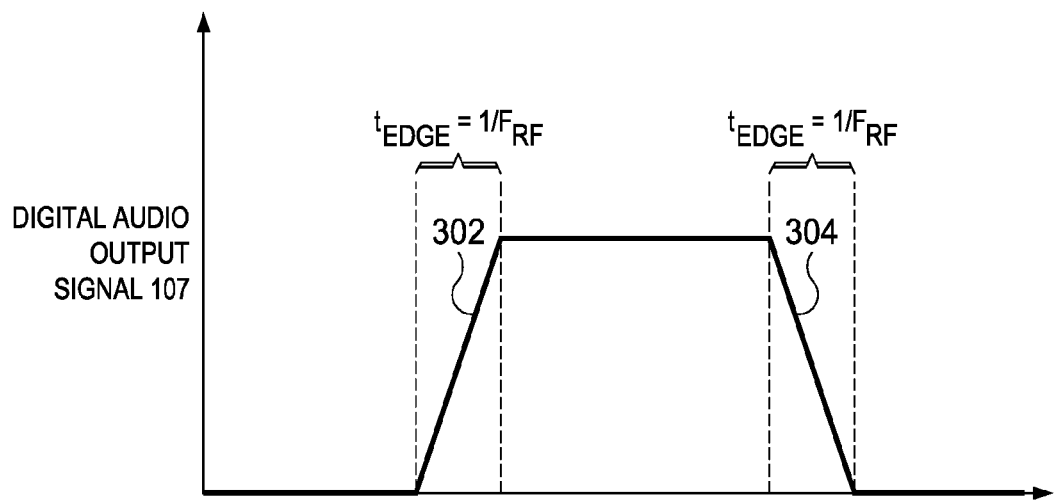
FIG. 3 illustrates example graphs depicting modification of timing of transitions of a digital signal, in accordance with embodiments of the present disclosure.

For example, in some instances, edge-rate module 221 of driver 219 may be configured to control an edge rate of a transition between logic levels of digital audio output signal 107 in order to reduce interference with an RF signal, as shown in FIG. 3. To further illustrate, for an RF signal having a particular frequency $f_{RF}$, edge-rate module 221 may control an edge rate $t_{EDGE}$ of a transition (e.g., one or both of a rising-edge transition 302 and a falling-edge transition 304) between logic levels of digital audio output signal 107 such that the spectral content of digital audio output signal 107 with such edge rate $t_{EDGE}$ has a frequency notch at the particular frequency (e.g., $t_{EDGE}=1/f_{RF}$). As a specific example, for an RF signal of frequency 1 GHz, edge-rate module 221 may reduce interference with the RF signal by controlling the edges of digital audio output signal 107 to have linear edges with an edge rate of 1 ns (1/1 ns=1 GHz).

Figure 4:
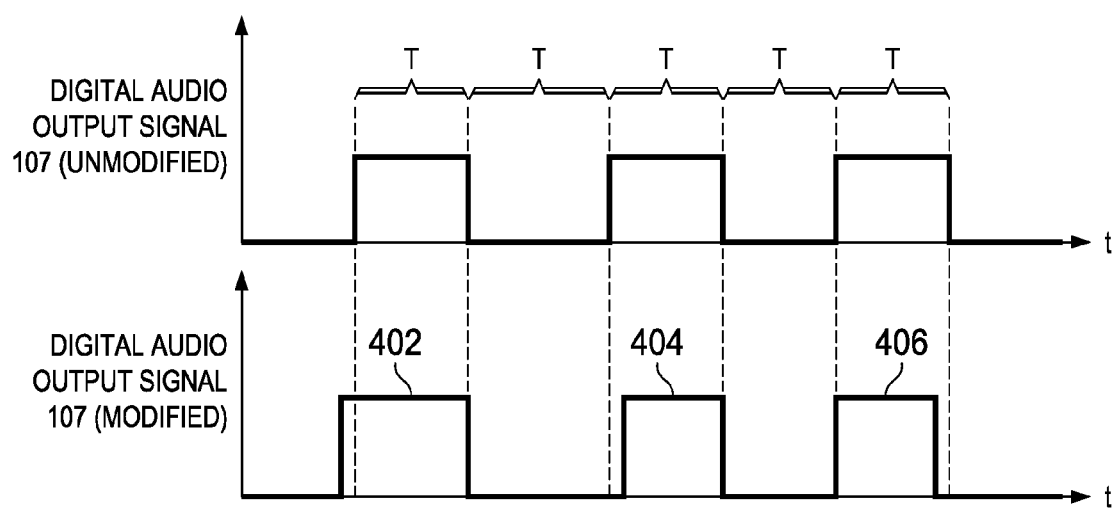
FIG. 4 illustrates example graphs depicting modification of timing of transitions of a digital signal, in accordance with embodiments of the present disclosure.

As another example, an edge-decision module 223 of driver 219 may control one or more transitions between logic levels of digital audio output signal 107 by controlling a time at which the one or more transitions occur, based on the frequency of the RF signal, as shown in FIG. 4. As depicted in FIG. 4, digital audio output signal 107 may experience transitions at a selected clock rate $f_{CLK}$ (e.g., a transition once per period T, such that selected clock rate frequency $f_{CLK}=1/2T$). If the frequency of an RF signal is an odd integer multiple of selected clock rate $f_{CLK}$ (e.g., $f_{CLK}$, $3f_{CLK}$, $5f_{CLK}$, $7f_{CLK}$, etc.), digital audio output signal 107 may cause interference in the RF signal. Thus, to reduce or eliminate RF signal interference caused by spectral content of digital audio output signal 107, edge-decision module 223 may time-shift a transition edge a particular amount of time, while maintaining digital audio output signal 107 such that with the time-shifted edges, an average clock rate of $f_{CLK}$ is maintained. For example, transition edges may be time-shifted forward in time, as is the case for edge 402, or backward in time, as is the case for edge 404. Also, while edges 402 and 404 depict such time-shift occurring on a rising edge of digital audio output signal 107, edge-decision module 223 may also cause such time shift to occur on trailing edges of digital audio output signal 107, as is the case for edge 406. In these embodiments, edge-decision module 223 may be further configured to, based on one or more previous transitions between logic levels of digital audio output signal 107, determine the time at which the one or more transitions occur. For example, to minimize interference, edge-decision module 223 may cause time shifts of a particular edge (e.g., whether it is a rising edge or falling edge) to alternate between being forward time shifted and backward time shifted (e.g., alternating between edges 402 and 404 shown in FIG. 4). Edge-decision module 223 may determine whether to delay, advance, or leave alone an edge in response to calculating time position of an edge which creates the least amount of spectral energy content of digital audio output signal 107 in the RF band to be avoided. Such calculation may be performed by filtering an edge rate of digital audio output signal 107, and choosing an edge position contributing the least spectral energy in the RF band to be avoided, from two or more choices of edge position. Such filter can be implemented with an infinite-impulse response filter or a finite-impulse response filter.

In these and other embodiments, an amplitude-control module 225 of driver 219 may control digital audio output signal 107 by controlling its amplitude based on the frequency of the RF signal. For example, if the frequency of the RF signal is such that it experiences interference from spectral content of digital audio output signal 107, amplitude-control module 225 may reduce an amplitude of digital audio output signal 107.

The foregoing discussion has contemplated driver 219 controlling digital audio output signal 107 based on a frequency of a single RF signal. However, in some embodiments, driver 219 may be configured to receive an indication of a second frequency of a second RF signal (either associated with the same RF transceiver 111 or a second device external to driver 219 and RF transceiver 111) and, when generating the digital signal, may be configured to control the digital signal based on both RF frequencies such that interference of both RF signals by spectral content of digital audio output signal 107 is minimized In such embodiments, the RF signals may each be wireless telephony signals of the same multi-band telephony system.

Although the foregoing discussion has contemplated controlling a digital audio output signal 107 of a digital microphone system in order to reduce signal interference, the systems and methods described herein may be applied to a driver for any digital signal in order to reduce signal interference caused by spectral content of such digital signal.

In addition, although the foregoing discussion has contemplated reducing or eliminating interference of RF signals, the systems and methods described herein may be applied to reduce or eliminate interference in any suitable signal external to a digital data driver and digital data receiver.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
a digital data driver for generating a digital signal for communication to a digital data receiver at a selected clock rate, the digital data driver configured to:
receive an indication of a frequency of an external signal associated with a device external to the digital data driver and the digital data receiver; and
when generating the digital signal, control the digital signal based on the frequency such that interference of the external signal by spectral content of the digital signal is minimized, while maintaining the selected clock rate.

2. The system of claim 1, wherein the digital data driver controls the digital signal by controlling one or more transitions between logic levels of the digital signal based on the frequency.

3. The system of claim 2, wherein the digital data driver controls one or more transitions between logic levels of the digital signal by controlling an edge rate of each of the one or more transitions based on the frequency.

4. The system of claim 2, wherein the digital data driver controls one or more transitions between logic levels of the digital signal by controlling a time at which the one or more transitions occur based on the frequency.

5. The system of claim 4, wherein the digital data driver is further configured to, based on one or more previous transitions between logic levels of the digital signal, determine the time at which the one or more transitions occur.

6. The system of claim 4, wherein the system further comprises the digital data receiver, and the digital data receiver is configured to, based on one or more previous transitions between logic levels of the digital signal, determine the time at which the one or more transitions occur.

7. The system of claim 1, wherein the digital data driver controls the digital signal by controlling an amplitude of the digital signal based on the frequency.

8. The system of claim 1, wherein the digital data driver and the device are integral to a single mobile device.

9. The system of claim 1, wherein the external signal is a radio-frequency signal.

10. The system of claim 9, wherein the radio-frequency signal comprises one of a wireless telephony signal, a Global Positioning System signal, and a Wireless Fidelity signal.

11. The system of claim 1, wherein the digital data driver is further configured to:
receive an indication of a second frequency of a second external signal associated with the device or a second device external to the digital data driver and the digital data receiver; and
when generating the digital signal, control the digital signal based on the second frequency such that interference of the second external signal by spectral content of the digital signal is minimized.

12. The system of claim 11, wherein the external signal and the second external signal are wireless telephony signals of the same multi-band telephony system.

13. The system of claim 11, wherein the digital data driver controls one or more transitions between logic levels of the digital signal by controlling an edge rate of each of the one or more transitions based on the frequency and by controlling a time at which the one or more transitions occur based on the second frequency.

14. A method comprising:
receiving an indication of a frequency of an external signal associated with a device external to a digital data driver and a digital data receiver, wherein the digital data driver is configured to generate a digital signal for communication to the digital data receiver at a selected clock rate; and
controlling the digital signal based on the frequency such that interference of the external signal by spectral content of the digital signal is minimized, while maintaining the selected clock rate.

15. The method of claim 14, wherein controlling the digital signal comprises controlling one or more transitions between logic levels of the digital signal based on the frequency.

16. The method of claim 15, wherein the controlling one or more transitions between logic levels of the digital signal comprises controlling an edge rate of each of the one or more transitions based on the frequency.

17. The method of claim 15, wherein the controlling one or more transitions between logic levels of the digital signal comprises controlling a time at which the one or more transitions occur based on the frequency.

18. The method of claim 17, further comprising determining the time at which the one or more transitions occur based on one or more previous transitions between logic levels of the digital signal.

19. The method of claim 14, wherein controlling the digital signal comprises controlling an amplitude of the digital signal based on the frequency.

20. The method of claim 14, wherein the digital data driver and the device are integral to a single mobile device.

21. The method of claim 14, wherein the external signal is a radio-frequency signal.

22. The method of claim 21, wherein the radio-frequency signal comprises one of a wireless telephony signal, a Global Positioning System signal, and a Wireless Fidelity signal.

23. The method of claim 14, further comprising:
receiving an indication of a second frequency of a second external signal associated with the device or a second device external to the digital data driver and the digital data receiver; and
controlling the digital signal based on the second frequency such that interference of the second external signal by spectral content of the digital signal is minimized.

24. The method of claim 23, wherein the external signal and the second external signal are wireless telephony signals of the same multi-band telephony system.

25. The method of claim 23, wherein controlling one or more transitions between logic levels of the digital signal comprises controlling an edge rate of each of the one or more transitions based on the frequency and controlling a time at which the one or more transitions occur based on the second frequency.

\* \* \* \* \*